No. 800,010. PATENTED SEPT. 19, 1905.
J. S. PARROTT.
MILK COOLER.
APPLICATION FILED NOV. 1, 1904.
2 SHEETS—SHEET 1.
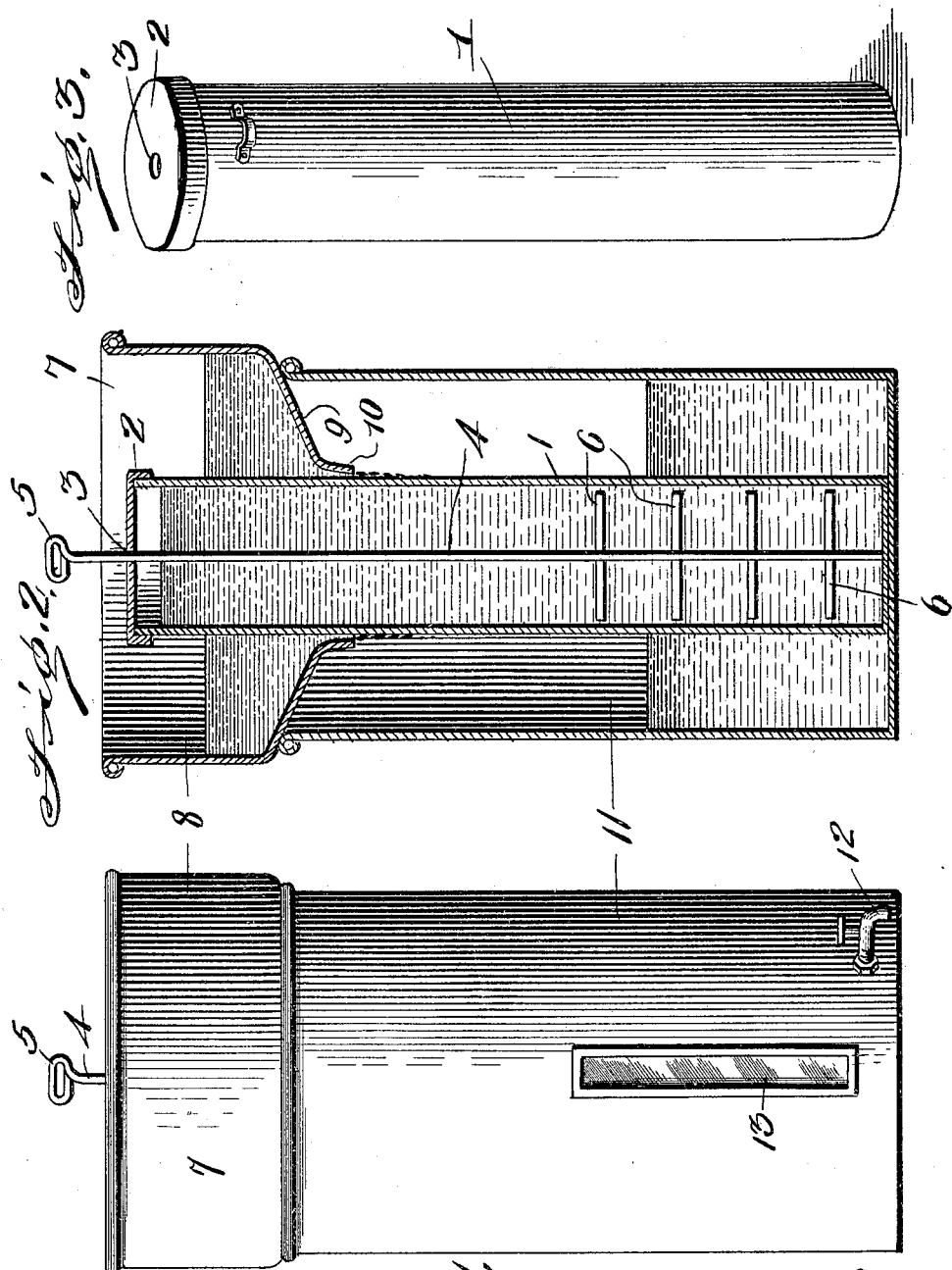
Witnesses
Jas. A. Koell.
L O Heilton
Inventor
J. S. Parrott,
by H. B. Wilson
Attorney No. 800,010. PATENTED SEPT. 19, 1905.
J. S. PARROTT.
MILK COOLER.
APPLICATION FILED NOV. 1, 1904.
2 SHEETS—SHEET 2.
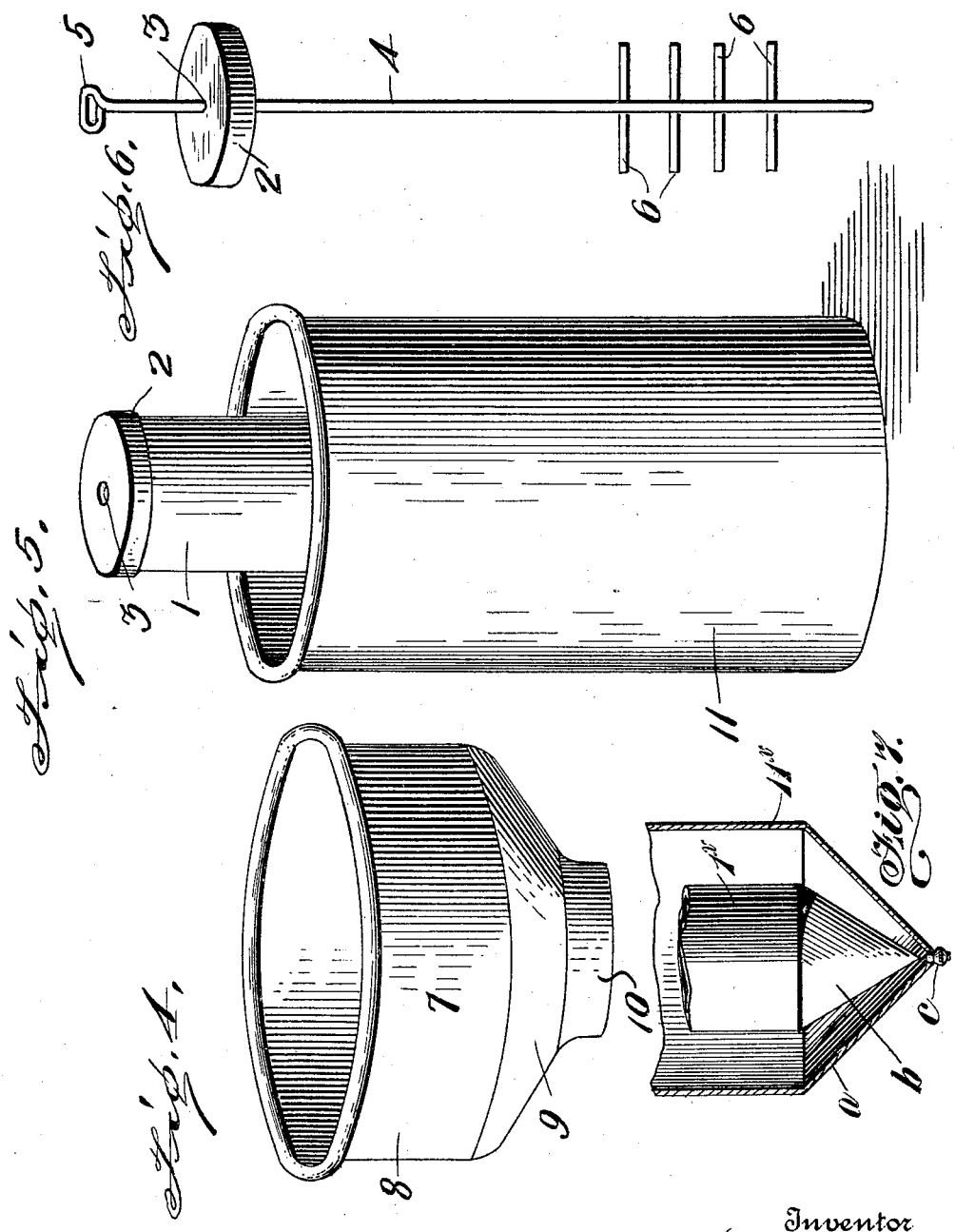
Witnesses
Jas. A. Koehl
L. O. Hilton
Inventor
J. S. Parrott,
by H. B. Wilson
Attorney

UNITED STATES PATENT OFFICE.

JOSEPH S. PARROTT, OF CASS CITY, MICHIGAN.

MILK-COOLER.

No. 800,010. Specification of Letters Patent. Patented Sept. 19, 1905.

Application filed November 1, 1904. Serial No. 231,010.

*To all whom it may concern:*

Be it known that I, JOSEPH S. PARROTT, a citizen of the United States, residing at Cass City, in the county of Tuscola and State of Michigan, have invented certain new and useful Improvements in Milk-Coolers; and I do declare the following to be a full, clear, and exact description of the invention, such as will enable others skilled in the art to which it appertains to make and use the same.

My invention relates to milk-coolers; and one of the objects of the same is to provide a device of simple construction which will quickly and thoroughly cool the milk and separate the cream therefrom.

Another object is to provide a milk-cooler and cream-separator which will present the milk in a comparatively thin stream or film to an interior water-jacket or inner tubular water-container in order that the milk may be quickly cooled and the cream readily separated therefrom.

These and other objects are attained by means of the construction illustrated in the accompanying drawings, in which—

Figure 1 is a side view of a milk-cooler made in accordance with my invention. Fig. 2 is a central vertical section of the same. Fig. 3 is a perspective view of the water-container or inner receptacle. Fig. 4 is a similar view of the milk-receptacle. Fig. 5 is a perspective view of the inner or water receptacle and the outer or milk receptacle surrounding said water-receptacle. Fig. 6 is a perspective view of the cover for the water-receptacle and showing the water-agitator or plunger passing through said cover. Fig. 7 is a detail section showing a modified form of the inner and outer receptacles.

Referring to the drawings for a more particular description of my invention, the numeral 1 designates the inner or cold-water receptacle provided with a cover 2, having a central opening 3 therein, and a suitable agitator or stirrer 4, passing through the opening 3 and provided with a suitable handle 5 and with a number of arms or dashers 6. The milk-receiver 7 has an enlarged upper end 8 and an inclined bottom portion 9 and a tubular extension 10, which is slightly larger than the diameter of the water-receptacle 1. Any suitable receptacle 11 may be employed to receive the milk after it has been cooled by the device referred to.

The operation of my invention is as follows: The water-container 1 having been filled with cold water is inserted in the opening 10 in the milk-receptacle 7. These parts are then placed in position upon any suitable can or receptacle for receiving the milk. The milk to be cooled is then poured into the receiver 7 and surrounds the water-casing 1 and in a comparatively thin stream or film trickles down around the cold-water casing 1 into the milk-receptacle 11. The stirrer or agitator is operated to present cold water around the inner wall of the water-receptacle 1 and to agitate the water from the bottom to the top in order that the milk may be quickly cooled and the cream separated therefrom.

A suitable cock 12 may be employed for removing the milk and cream, and, if desired, a sight-opening 13 may be utilized for indicating the height of the milk and cream in the milk-container or outer receptacle.

From the foregoing it will be obvious that my invention is simple in construction, can be produced at slight cost, is efficient for its purpose, and will cool the milk in a very short time, owing to the fact that the milk is presented in a comparatively thin stream or film to the outer wall of a cold-water jacket or receptacle.

As shown in Fig. 7, the inner receptacle $1^\times$ and the outer receptacle $11^\times$ may have conical bottoms $a$ and $b$, and a cock $c$ may be attached at the apex of said outer receptacle, thus serving to permit the milk to be quickly withdrawn from the cream.

Various changes in the form, proportions, and minor details of construction may be resorted to without departing from the principle or sacrificing any of the advantages of the invention.

Having thus described my invention, what I claim, and desire to secure by Letters Patent, is—

A cream-separator or milk-cooler comprising a milk-receptacle a cylindrical water-container adapted to be placed within the milk-receptacle to contain cold water, a vertically-movable agitator or plunger-rod provided with arms or dashers within the water-container, a milk-receiver surrounding the water-container at its upper end and having an inclined bottom and a tapering tubular extension adapted to lie closely against the water-container, substantially as described.

In testimony whereof I have hereunto set my hand in presence of two subscribing witnesses.

JOSEPH S. PARROTT.

Witnesses:
   E. B. LANDON,
   GEO. E. PERKINS.